H. R. LYTLE.
DREDGE.
APPLICATION FILED MAR. 4, 1912.

1,118,565.

Patented Nov. 24, 1914.
2 SHEETS—SHEET 2.

Witnesses:
F. E. Maynard.
J. H. Herring

Inventor:
Harry R. Lytle,
By G. H. Strong.
his Atty

UNITED STATES PATENT OFFICE.

HARRY R. LYTLE, OF DAVIS, CALIFORNIA, ASSIGNOR OF SIX-SEVENTHS TO WILLIAM J. RHOADS, F. H. ARMSBURGER, WILL KUECHLER, M. MENASSES, AND A. WILBUR, ALL OF STOCKTON, CALIFORNIA, AND WILL A. DOWER, OF SAN ANDREAS, CALIFORNIA.

DREDGE.

1,118,565.      Specification of Letters Patent.      Patented Nov. 24, 1914.

Application filed March 4, 1912. Serial No. 681,459.

*To all whom it may concern:*

Be it known that I, HARRY R. LYTLE, a citizen of the United States, residing at Davis, in the county of Yolo and State of California, have invented new and useful Improvements in Dredges, of which the following is a specification.

This invention relates to a dredging apparatus.

An object of the present invention is to provide a dredge involving a boom pivoted for elevation in a vertical plane and carrying a rotary bucket or shovel at its free end.

It is a further object of the invention to provide in a dredging apparatus the combination with a float having a hinged elevating boom, a bucket or excavator capable of being lowered by the boom to a considerable depth below the float and then being elevated to a position above the float, and subsequently revolved to discharge inboard on to a flume or chute on the dredge; means being provided to render the scraper or bucket automatically returnable to a normal digging position.

The invention consists of the parts and the construction and combination of parts as hereinafter more fully described and claimed, having reference to the accompanying drawings, in which—

Figure 1:
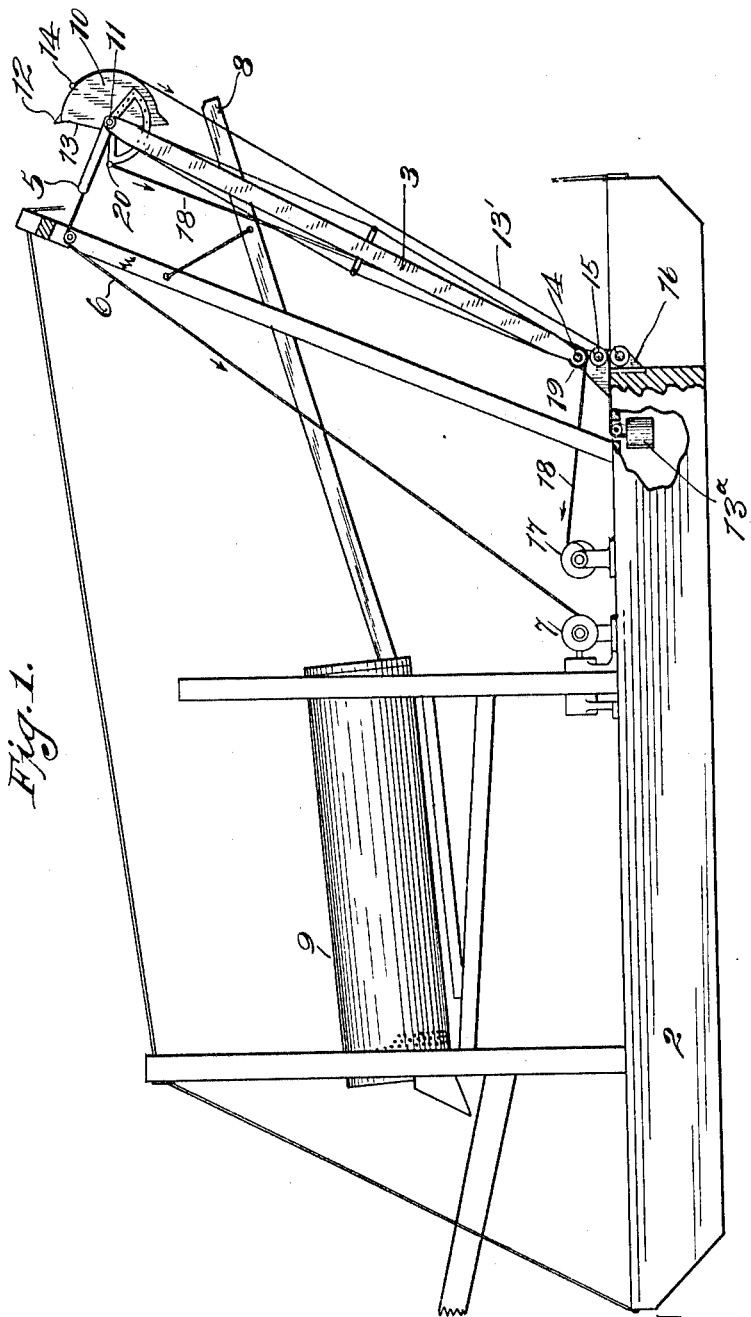
Figure 2:
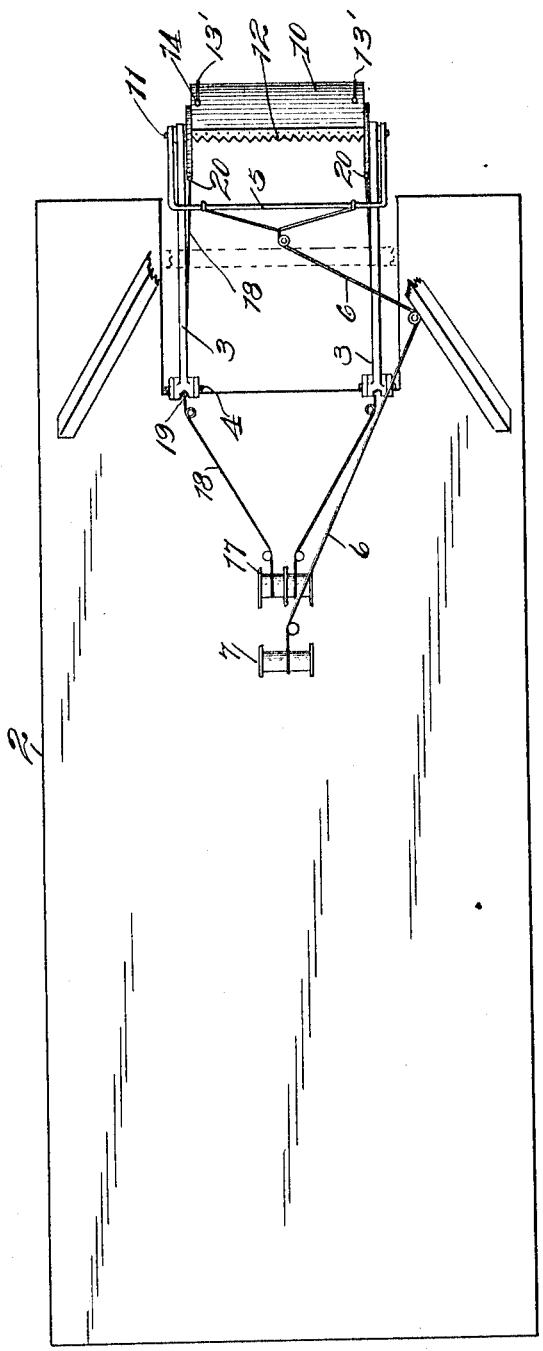

Figure 1 is a side elevation of the improved dredge. Fig. 2 is a plan view of the same.

In the illustrated embodiment of my invention 2 represents a suitable dredge, upon which is mounted an appropriate superstructure, engines, and other apparatus necessary for the usual operation of the dredge, there being mounted on the front edge of the dredge booms 3 pivoted on transverse gudgeons or supports 4 and connected at their outer ends by a bail 5 to a haul or elevator cable 6.

The boom elevating cable 6 is connected to an appropriately driven drum 7, which when driven in one direction, serves to lift or swing the booms 3 on their pivots 4 carrying the upper ends of the booms into a position over the upper end of a chute or flume 8 adapted to discharge material admitted into it into a screen or other handling apparatus 9 on the barge. When it is desired to lower the booms 3, the cable 6 is allowed to run off the drum 7 and the upper ends of the booms are lowered to the desired elevation, so as to carry into contact with the material being operated upon, a peculiar and especially designed shovel or bucket 10, which is rotatably supported on a shaft 11 in the outer ends of the booms 3.

The axis or shaft 11 of the bucket 10 is in a horizontal plane, and the bucket is shown as semi-cylindrical in shape, having at its edges diggers 12 which may be projected into digging contact with the soil or material to be elevated, the side 13 being open to permit the entry and discharge of said material. As the bucket is rotated on its shaft 11, the material excavated by the diggers 12 enters the mouth 13 of the cylindrical bucket.

In operation, the booms are lowered by the unwinding of the cable 6 off the drum 7, until the bucket 10 is brought into juxtaposition with the material to be excavated, at which time the scrapers 12 of the bucket are automatically drawn downward into digging position by the retraction or pull of a cable or cables 13′ connected at 14 to the circumference or sides of the bucket, which cable 13′ passes downwardly beneath a sheave 15 mounted in a bracket 16 on the barge; the end of the cable 13′ being subjected to the pull of a weight, spring or other device 13ª adapted to automatically rotate the bucket 10 on its bearing 11.

As the booms 3 are lowered, the bucket automatically revolves to carry the scrapers 12 to the lowermost position relative to the shaft 11, and when the bucket is brought into juxtaposition with the material to be excavated, the operator of the barge applies power to revolve the bucket on its axis 11, by throwing into clutch a drum 17, on which a cable or cables 18 are wound. These cables pass around sheaves 19 mounted on the pivots 4 of the boom 3. The ends of the cables 18 are connected at 20 to arms or brackets secured to the ends of the bucket 10.

When power is applied to pull the cable or cables 18 it causes the bucket to revolve on its axis 11, forcing the diggers 12 of the bucket into digging engagement with the soil, and as the bucket is revolved, the earth is collected by entering the mouth 13 of the bucket; and when it is filled to the desired extent, the operator throws the drum 7 into clutch with its engine to wind the cable 6, lifting the booms and simultaneously winding the cable 18 to rotate the bucket on its axis and carry the mouth 13 to a substantially horizontal position above the shaft 11. When the bucket is brought to a position over the upper end of the chute 8, the bucket is then further revolved or tilted by its cable 18 into position to permit the contents of the bucket to discharge from the lower edge of the bucket onto the chute, down which the material will run into the apparatus indicated at 9.

Having discharged the load, by revolving the bucket through means of the cable 18, the operator then releases the drum 17 and immediately the automatic operation of the bucket returning device, including the chain or cable 13' and its connected actuating element 13ª, will swing the bucket about its shaft 11 to its initial or digging position relative to the booms 3; and the operator again permits the boom to be lowered by slacking up on the cable 6 and lowering the bucket 10 into position to operate upon the material to be excavated.

My improved dredge, constructed and operated as above set forth, is especially adapted to placer mining, as it digs toward the bank and does not scrape the dirt from the bank as is customary in dredging machines. This is an important feature, as it causes the material to be taken into the bucket without being so disturbed as to allow the gold to settle to the bottom before the gravel enters the bucket. The arrangement whereby the bucket is swung between two booms provides a wide range for the swing of the bucket, the depth of its digging being only limited by the height of the gauntree from which it swings. The rotation of the bucket on its axis between the two booms, which permits the material to be taken into the bucket at one edge 12, which becomes the upper edge when the bucket is in discharging position, (Fig. 1), and permits the material to discharge at the opposite or lower edge of the bucket, is an important feature, which, combined with the arrangement of the booms, permits an efficient and powerful digging action through a wide range, and at the same time the necessary elevation of the bucket to discharge onto the chute 8. As the bucket may be reversed so that when the digging side becomes worn the other side may be used, the life of the bucket is materially lengthened.

From the foregoing it will be seen that I have provided a dredge involving details of construction which are of extremely substantial design; are operable at small expense of maintenance and repair; are simple; and the apparatus as a whole is light and durable, and the capacity of the dredge can be varied to suit the nature of the material being handled by changing the proportions of the excavator or bucket 10.

Various modifications in the details of construction and arrangements of parts may be made without departing from the spirit and scope of my invention, and I wish therefore not to be limited to the exact construction disclosed.

Having thus described my invention, what I claim and desire to secure by Letters Patent is—

1. The combination with a dredge or float, of a boom swinging in a vertical plane and connected to said dredge at one end thereof and adapted to swing upward and downward to approximately vertical positions, a rotary bucket pivoted to and projecting beyond the swinging end of the boom, and rotatable while the boom is stationary to dig a load, means to positively rotate the bucket in the same direction during the digging operation and the discharge of the load, and automatic means operatively connected to the bucket for reversing the bucket after its load has been discharged when the means for positively rotating the bucket is released.

2. In a dredge, a vertically swinging support, a bucket carried thereby and rotatable about a horizontal axis, means to swing the support and bring the bucket to loading and unloading positions, mechanism to both load and unload the bucket by rotation thereof on its axis in one direction, and means to automatically reverse the bucket after it is unloaded and thereby return it from discharging to loading position.

3. In a dredge, the combination of a digging bucket, a support in which the bucket is pivotally mounted, means to operate the support and carry the bucket bodily to digging and discharging positions, mechanism to rotate the bucket and discharge its contents, a cable connected to the bucket, and means to automatically operate the cable and rotate the bucket in the reverse direction after its contents have been discharged.

4. In a dredge, the combination of a bucket having a horizontal axis, supporting members carrying the bucket and mounted to swing in vertical planes, mechanism to first rotate the bucket and thereby load it, then swing the supporting members upward to unloading position, and then further rotate the bucket in the same direction to unload it, a cable connected to the bucket to rotate it in the reverse direction, and means to maintain a continuous tension on said cable, and thereby automatically return the bucket from unloading to loading position when released from said returning mechanism.

In testimony whereof I have hereunto set my hand in the presence of two subscribing witnesses.

HARRY R. LYTLE.

Witnesses:
FRANK LIGGETT,
M. E. SPAULDING.

Copies of this patent may be obtained for five cents each, by addressing the "Commissioner of Patents, Washington, D. C."